No. 889,181. PATENTED MAY 26, 1908.
O. W. DAVIS.
TRANSMISSION MECHANISM.
APPLICATION FILED OCT. 24, 1906.
4 SHEETS—SHEET 1.
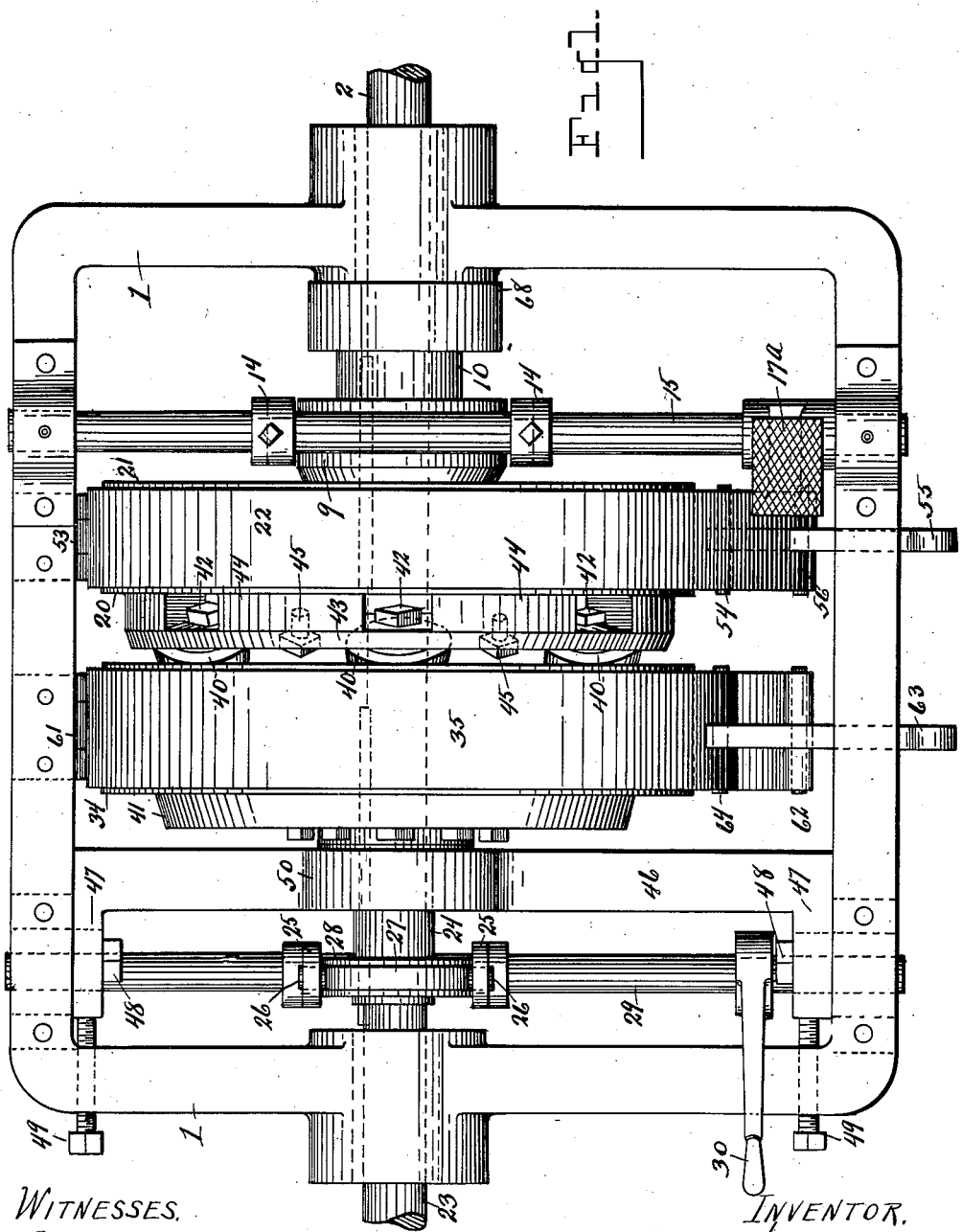
WITNESSES.
O. B. Baenziger,
J. G. Howlett.
INVENTOR.
Orson W. Davis.
By T. S. Wheeler & Co. attys.

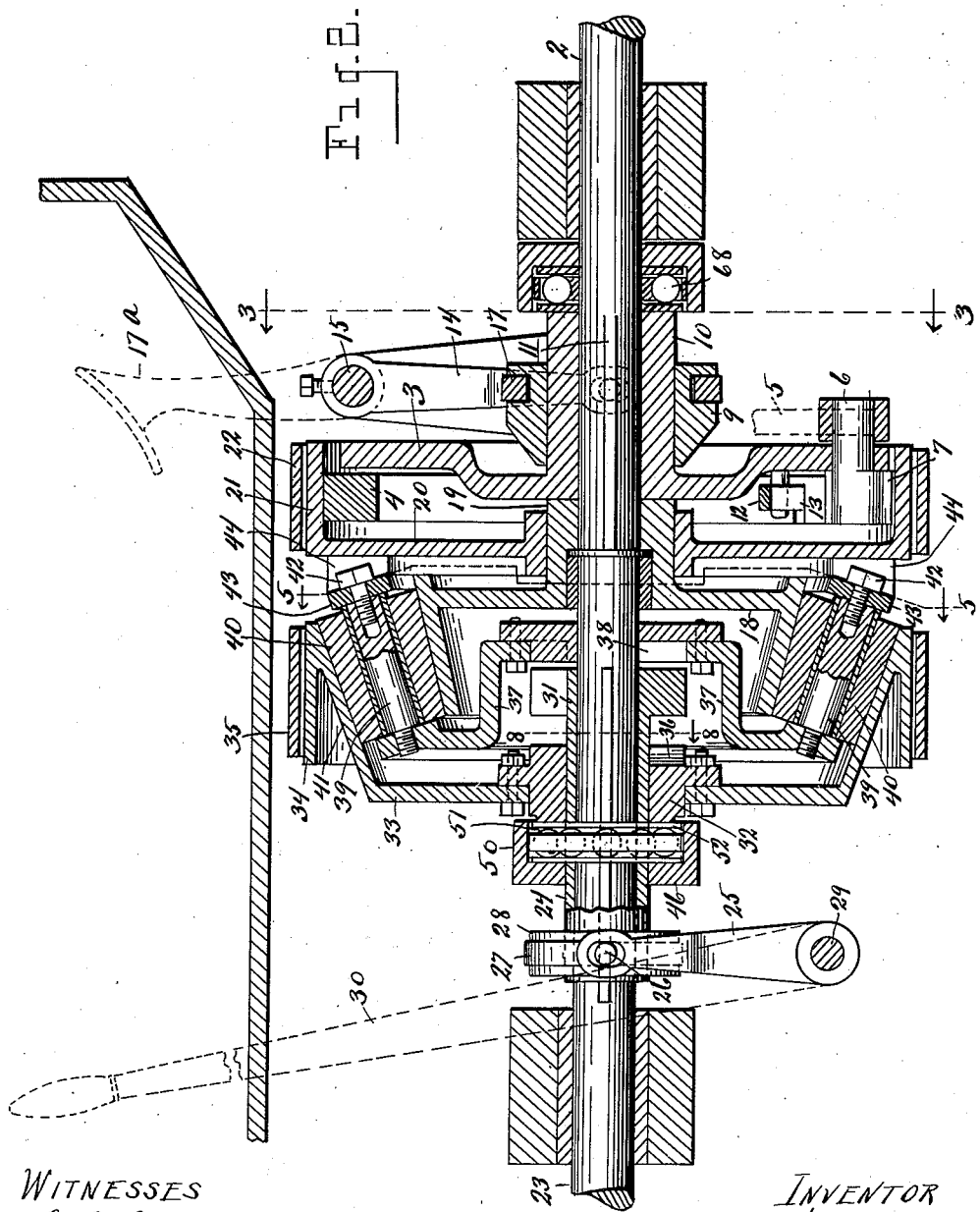

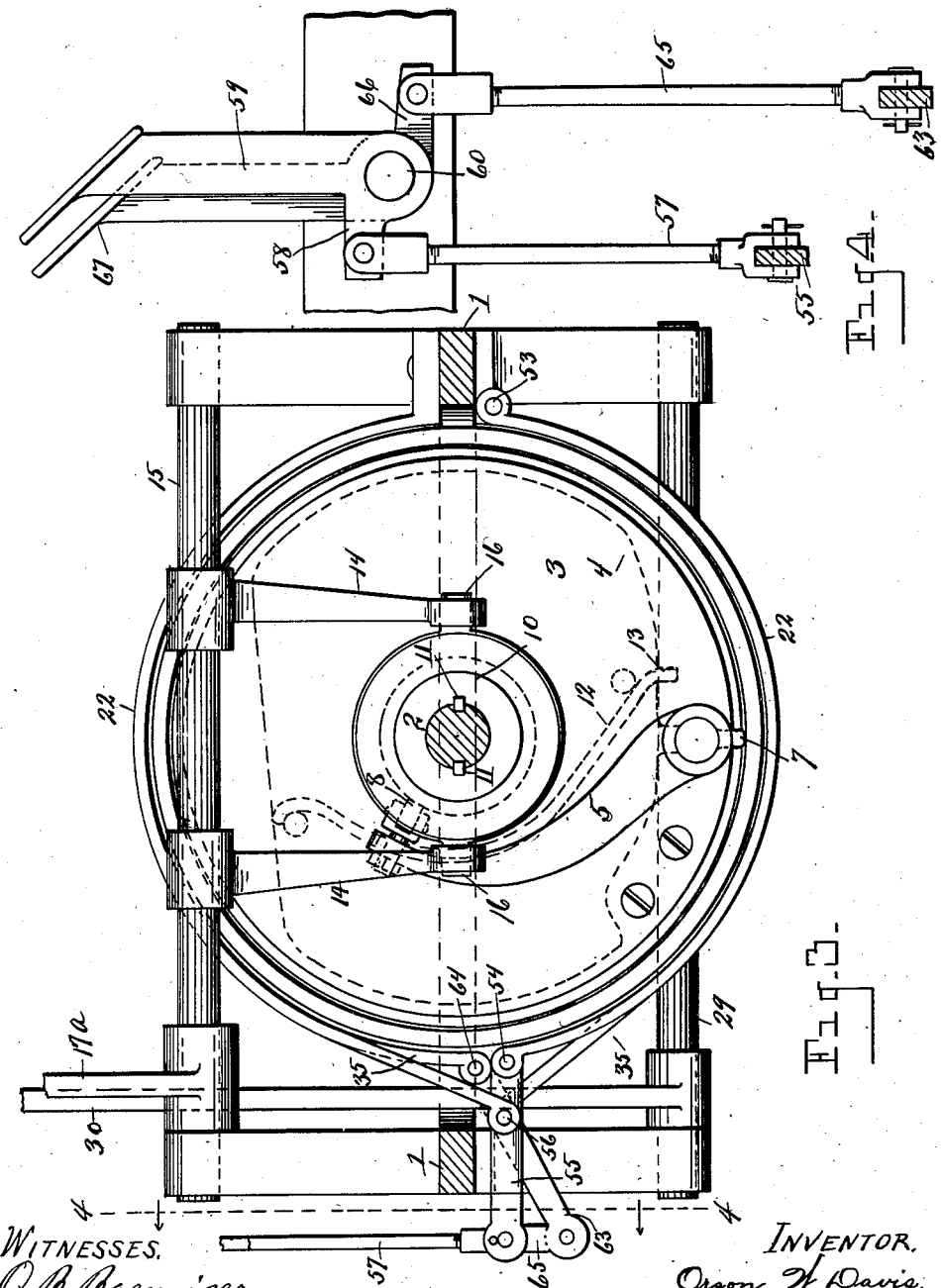

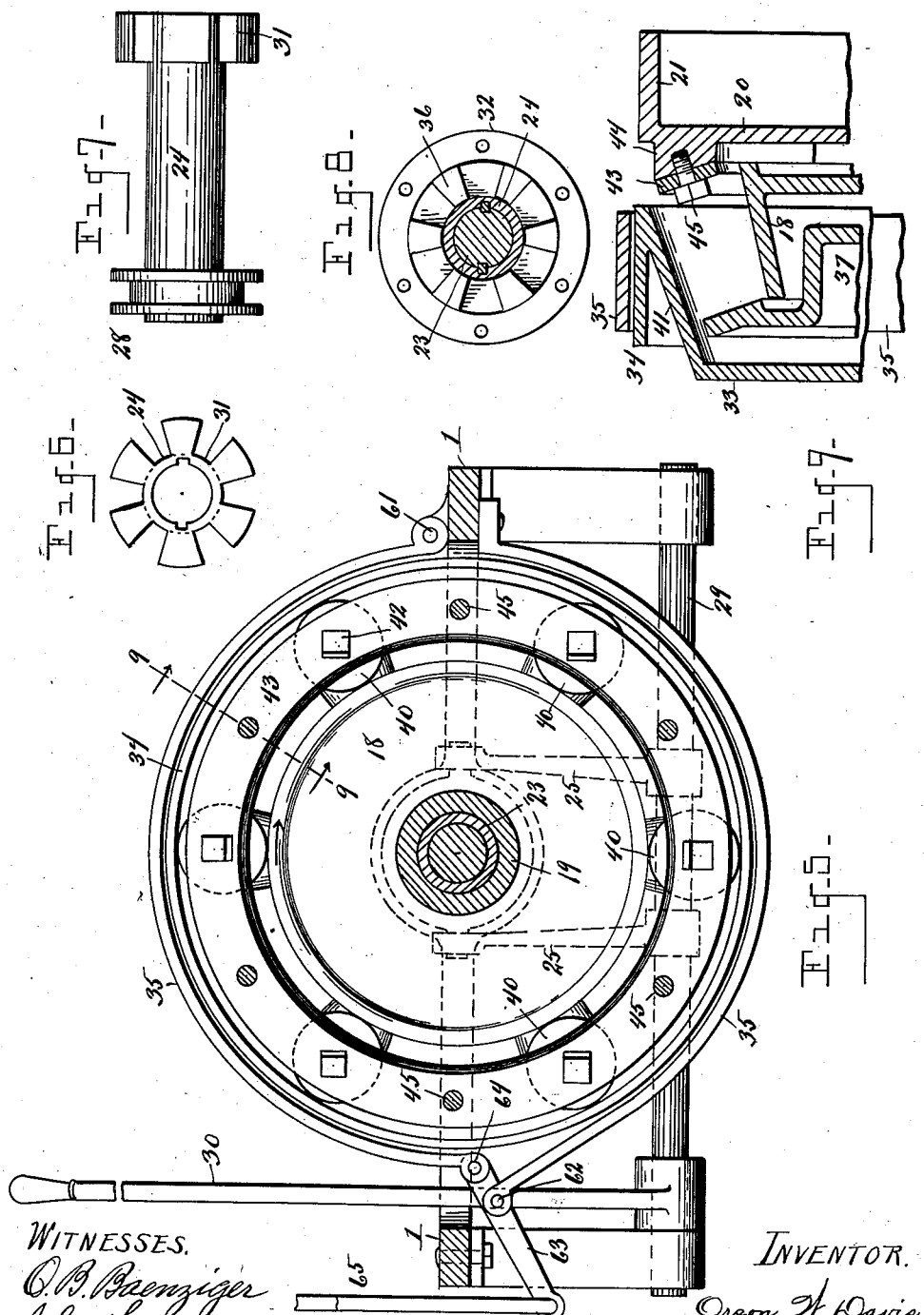

UNITED STATES PATENT OFFICE.

ORSON W. DAVIS, OF ROCHESTER, NEW YORK, ASSIGNOR, BY DIRECT AND MESNE ASSIGN-
MENTS, TO GEARLESS TRANSMISSION CO., OF ROCHESTER, NEW YORK, A CORPORATION
OF NEW YORK.

TRANSMISSION MECHANISM.

No. 889,181.          Specification of Letters Patent.          Patented May 26, 1908.

Application filed October 24, 1906. Serial No. 340,354.

*To all whom it may concern:*

Be it known that I, ORSON W. DAVIS, a citizen of the United States, residing at Rochester, in the county of Monroe, State of New York, have invented new and useful Improvements in Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in frictional transmission mechanism, more especially designed for the propulsion of motor vehicles, and consists in the combination and arrangement of parts hereinafter fully set forth and claimed.

The object of the invention is to provide a frictional transmission mechanism of simple and compact construction, wherein the arrangement is such as to enable the driven shaft to be turned directly when driving ahead at high speed and indirectly through the transmission mechanism at a reduced speed.

A further arrangement provides for reversing the direction of rotation of the driven shaft at a reduced speed, and a still further arrangement provides for the free rotation with the shafts of all of the transmitting parts when on the direct drive.

The above object is attained by the structure illustrated in the accompanying drawings, in which:—

Figure 1 is a plan view of a structure showing one embodiment of my invention. Fig. 2 is a central longitudinal section therethrough, the shafts appearing in elevation and other parts being indicated by dotted lines. Fig. 3 is a transverse section as on line 3—3 of Fig. 2. Fig. 4 is a fragmentary view in detail of the pedals and connected parts which actuate the contractible bands adapted to clamp or lock some of the rotary parts of the transmission mechanism, as hereinafter explained. Fig. 5 is a transverse section as on line 5—5 of Fig. 2. Fig. 6 is an end elevation of a slidable sleeve mounted on the driven shaft, showing a jaw clutch member at the end thereof. Fig. 7 is a side elevation of said sleeve. Fig. 8 is a sectional view through the shaft and sleeve as on line 8—8 of Fig. 2. Fig. 9 is an enlarged fragmentary view in section as on line 9—9 of Fig. 5.

Referring to the characters of reference, 1 designates a local or supplementary frame in which the transmission mechanism is mounted and which will be secured in any suitable manner to the main frame of the car, not shown. Suitably journaled in the supplementary frame is the engine or motor shaft 2. Mounted on the motor shaft is a disk 3 carrying a floating expansible clutch ring 4 adapted to be actuated to set and release the clutch by means of the pivoted arm 5 which is mounted on a short rock shaft 6 journaled in the web of the disk 3, and having upon its inner end a lip 7 which lies between the ends of the expansible ring 4, as shown in Fig. 3 and which by a rotation of the shaft 6 will expand said ring, as will be well understood in the art. The arm 5, through the operation of which said ring is expanded, carries upon its free end an antifriction roller 8 adapted to be engaged by a tapered collar 9 which is mounted to slide upon the hub 10 of the disk 3, said hub being keyed to the motor shaft by the longitudinally extending keys 11.

By a movement of the tapered collar 9 toward the disk 3, the arm 5 will be actuated to rotate the shaft 6 and expand the ring 4. A movement of said collar in the opposite direction will permit said arm to return to its normal position and allow said ring to contract, in which latter operation, it is assisted by means of the curved spring 12 which is mounted on the disk 3 and one end of which engages, as at 13, (see Fig. 3) the free end of the ring 4. The collar 9 is actuated through the medium of the depending arms 14 mounted on the rock shaft 15 which is suitably supported on the frame, said arms receiving in their lower ends the pins 16 which project from the ring 17 lying in a peripheral channel in the collar 9. Connected with the shaft 15 is a pedal 17ª through the medium of which said shaft may be rocked to operate the sliding collar 9.

Connected to the inner end of the motor shaft by means of the keys 11 is a driving cone 18, said cone having a projecting hub 19. Mounted to revolve freely upon the hub 19 of the cone 18 is a disk 20 provided at its periphery with a lateral flange 21 embraced by a contractible brake band 22. The flange 21 of the disk 20 embraces or overhangs the expansible clutch ring 4 whereby upon the expansion of said ring through the operation of the slidable collar 9, it is caused to grip the inner wall of said flange 21 and lock the disks 3 and 20 together to cause them to turn in unison.

The driven shaft is indicated at 23 and the inner end thereof is journaled in the hub 19 of the driving cone 18. Splined to the driven shaft is a slidable sleeve 24 actuated through the medium of a yoke 25 which engages the pins 26 in the ring 27 lying in a channel in the periphery of the collar 28 mounted on the end of said sleeve, said yoke being attached to a rock shaft 29 which is operated by a lever 30. On the inner end of the sleeve 24 is a clutch collar 31 having jaw members facing both ways. Loosely mounted on the sleeve 24 is the hub 32 of the roller driven reversing disk 33 having a flange 34 embraced by a band brake 35. The inner face of the hub 32 of the disk 33 is provided with clutch members 36 adapted to be engaged by the corresponding members of the clutch collar 31 on the sleeve 24.

Loosely mounted upon the inner end of the driven shaft is a cage or roller-carrying disk 37 whose hub is provided with clutch members 38 also adapted to be engaged by the clutch members of the collar 31. Secured in the periphery of the cage or roller-carrying disk 37 are a number of roller spindles 39 which stand at an angle to the axis of said cage and upon which are journaled the tapered transmission rollers 40 which have peripheral contact with the face of the driving cone 18 and with the inner face of the inclined wall 41 of the reversing disk 33. The opposite ends of the spindles are supported by the bolts 42 which passes through the ring 43. Upon the inner face of the disk 20 are a number of integral bosses 44 into which are screwed the bolts 45 (see Fig. 9) which pass through the ring 43 and serve to rigidly unite said ring to the disk 20. By this arrangement the disk 20, the spindles 39 of the rollers and the cage 37 are firmly bound together, while the rollers 40 are journaled upon the spindles 39 and become interposed between the periphery of the cone 18 and the inner face of the inclined wall of the disk 33.

To provide for sufficient thrust against the hub of the disk 33 to maintain the necessary frictional contact between the inclined wall of said disk and the transmitting rollers, and between said rollers and the periphery of the driving cone, a transverse thrust bar 46 is employed whose opposite ends are provided with extensions 47 parallel with the frame and slotted to receive the bolts 48 which pass through said slots into said frame, whereby said bar is adjustably mounted. To move said bar, adjusting screws 49 are employed which are threaded in the frame and bear against the extensions 47. By turning said screws, any desired pressure may be applied to the frictional transmission members, said pressure being transmitted to the hub of the disk 33 through the medium of a ball case 50 carried by said bar which confines the bearing balls 51 and forces them against a bearing plate 52 lying against the end of the hub of said disk, as clearly shown in Fig. 2.

The lower portion of the contractible brake band 22 is hinged at 53 to the frame and the opposite end of said lower portion is pivoted at 54 to the inner end of the lever 55. The outer end of the upper portion of said band is pivoted at 56 to said lever 55 and becomes the fulcrum upon which said lever swings. Attached to the outer end of said lever is a connecting rod 57 whose upper end is pivotally connected to an arm 58 projecting from the hub of the pedal 59 which is loosely mounted upon the supporting shaft or stud 60. By pressing forward upon the pedal 59, the connecting rod will be depressed and the lever 55 actuated to contract the brake band 22 around the periphery of the flange of the disk 20. In like manner the upper portion of the brake band 35 is hinged at 61 to the frame, while the outer end thereof is pivoted at 64 to the inner end of lever 63 which is fulcrumed at 62 to the outer end of the lower portion of said band. Pivoted to the outer end of the lever 63 is a connecting rod 65 whose upper end is pivoted to an arm 66 projecting from the hub of the pedal 67, also loosely mounted on the shaft 60. By pressing the pedal 67 forward, the rod 65 will be drawn upon to contract the brake band 35 around the periphery of the reversing disk 33.

This improved transmission mechanism provides for two speeds ahead and one speed in the reverse. To afford the initial or starting speed when applied to a motor vehicle, the clutch collar 31 is made to engage the clutch members on the hub of the cage 37 carrying the rollers, and the brake band 35 is caused to clamp the flange of the reversing disk to prevent rotation thereof. The cone 18 being driven by the motor shaft, will then rotate the rollers 40 and cause them to roll around upon the inclined wall 41 of the disk 33 and rotate the cage 37 ahead, the clutch collar 31 and sleeve 24 imparting said rotary motion to the driven shaft 23, thereby affording an indirect drive ahead at slow speed.

To reverse the rotary motion of the driven shaft, the contractible brake band 22 is made to clamp the flange of the disk 20 and lock said disk from rotating; clutch collar 31 is moved to engage the hub of the reversing disk 33 and the contractible brake band 35 embracing the flange of said disk is released. The cage 37 carrying the transmitting rollers being held against rotation, the rotary movement imparted to the rollers through the cone 18 will be transmitted to the disk 33 through the inclined wall 41 thereof engaging said rollers, whereby said disk will be rotated in a direction opposite to that of said cone, which movement is imparted to the driven shaft through the clutch collar 31 and sleeve 24 and which will revolve the driven shaft at a lesser speed than the motor shaft owing to the difference in the diameters of the driving cone and the roller cage through which said motion is transmitted.

To effect a direct drive, the clutch collar on the sleeve 24 is made to engage the hub of cage 37, the contractible brake bands 22 and 35 are released and the floating clutch ring 4 expanded to lock the disk 3 to the disk 20, thereby connecting the motor and driven shafts directly through the disks 3 and 20, the ring 43, the spindles of the rollers, the cage 37 and the sleeve 24, in which position of parts the whole of the transmission mechanism revolves freely with the shafts and the driving is accomplished through positively engaging clutches, and not through the operation of friction driven parts.

When driving directly at high speed, the contractible band 22 becomes a brake band operating upon the flange of the disk 20. When reversing the rotation of the driven shaft, the contractible band 35 becomes a brake band operating on the flange of the reversing disk. It will now be understood that this improved transmission mechanism affords a direct drive ahead at high speed without employing any of the friction surfaces and affords a relatively slow forward and backward movement through the medium of the frictional transmitting members.

It will be noted that the disk 20, the ring 43 and the cage 37 form in effect a frame which supports the opposite ends of the transmitting rollers 40, and that the opposite ends of said frame are loosely journaled respectively upon the opposed ends of the motor and driven shafts. It will also be noted that the disk 20 forming one end of said frame may be locked to the driven shaft through the medium of the clutch ring 4, and disk 3 carrying said ring, and that the other end of said frame may be locked to the driven shaft through the medium of the clutch collar 31. It will further be noted that said frame may be locked from rotation when the clutches mentioned are released by a contraction of the brake band 22. It will further be noted that a roller thrust bearing 68 is provided to relieve the longitudinal thrust upon the shaft 2.

Having thus fully set forth my invention, what I claim as new and desire to secure by Letters Patent, is:—

1. In a transmission mechanism, the combination of the motor and driven shafts in axial alinement and independently rotatable, of means mounted upon said shafts and rotatable therewith for connecting them to cause them to turn in unison, and frictional transmission members some of which are supported independently of said shafts, and others of which are mounted on said shafts for connecting said shafts indirectly to drive the driven shaft in either direction at a speed different from that of the motor shaft.

2. In a frictional transmission mechanism, the combination of the motor and driven shafts independently rotatable, a frictional driving cone fast on the motor shaft, a member loose on the driven shaft, a series of friction rollers thereon engaging the periphery of the driving cone, a roller cage loose on the driven shaft having a friction surface engaging said friction rollers, means for locking the roller-carrying disk and the roller cage separately to the driven shaft, means for restraining the rotation of the member carrying said rollers, and means for restraining the rotation of the roller cage.

3. In a transmission mechanism, the combination of the motor and driven shafts independently rotatable, a driving cone fixed on the motor shaft having a friction surface, a cage loose on the driven shaft, friction rollers thereon engaging the surface of said cone, a reversing disk loose on the driven shaft having a friction surface engaging said rollers, means for independently locking said disk and the roller-carrying cage to the driven shaft, a disk loose on the motor shaft, means connecting said disk rigidly to the cage carrying the friction rollers, means for locking the disk on the motor shaft thereto to cause said disk to revolve therewith, and means for restraining the rotation of said reversing disk and of said disk loose on the motor shaft.

4. In a transmission mechanism, the combination of the motor and driven shafts independently rotatable, a driving cone fixed on the motor shaft having a friction surface, a disk loose on the driven shaft, friction rollers thereon engaging the surface of said cone, a reversing disk loose on the driven shaft engaging said rollers, means for locking the reversing disk and the disk carrying said rollers independently to the driven shaft, means for independently restraining the rotation of the disk carrying said rollers and the reversing disk, and means coöperating with the roller carrying disk when locked to the driven shaft for connecting said shafts to cause them to rotate at the same speed.

5. In a transmission mechanism, the combination of the motor and driven shafts journaled to rotate independently, of a driving cone having an inclined friction surface fixed to the motor shaft, a disk loose on the driven shaft, friction rollers carried by said disk engaging the friction surface of said cone, a reversing disk loose on the driven shaft having an inclined friction surface engaging said rollers, a slidable clutch for locking the reversing disk and the disk carrying said rollers independently to the driven shaft, means coöperating with said roller-carrying disk when locked to the driven shaft to cause said shafts to turn in unison, and means for restraining the rotation of the reversing disk and of the roller-carrying disk.

6. In a transmission mechanism, the combination of the motor and driven shafts journaled to rotate independently, a driving cone fixed on the end of the motor shaft having a friction face, a disk loose on the driven shaft, friction rollers mounted on said disk and engaging the face of said cone, a reversing disk loose on the driven shaft having a friction surface engaging said rollers, means for applying pressure to said reversing-disk to maintain a frictional contact between the wall thereof and the rollers and between the rollers and the driving cone, means for locking said reversing disk and said roller-carrying disk independently to the driven shaft, means for restraining the rotation of said reversing disk and said roller-carrying disk, and means coöperating with said roller-carrying disk when locked to the driven shaft to cause said shafts to turn in unison.

7. In a transmission mechanism, the combination of the motor and driven shafts journaled to rotate independently, a driving cone fixed on the motor shaft having an inclined friction face, a disk loose on the driven shaft, tapered rollers journaled on said disk and engaging the surface of said driving cone, a reversing disk loose on the driven shaft having an inclined friction face engaging said rollers, means for maintaining said reversing disk in frictional contact with the rollers and said rollers in frictional contact with said cone, means for locking the roller-carrying disk and the reversing disk independently to the driven shaft, means for restraining the rotation of the disk carrying said rollers, and means for restraining the rotation of said reversing disk.

8. In a transmission mechanism, the combination of the motor and driven shafts journaled to rotate independently, a driving cone fast on the motor shaft having a friction surface, a series of friction rollers engaging the surface of said cone, a reversing disk loosely mounted on the driven shaft having a friction surface engaging said rollers, means for locking said reversing disk to the driven shaft, means for maintaining frictional contact between said reversing disk and rollers and between said rollers and the driving cone, means for restraining the rotation of said reversing disk and for holding said rollers from revolving, and means coöperating with said rollers for connecting said shafts to cause them to revolve together.

9. In a transmission mechanism, the combination of the motor and driven shafts journaled to rotate independently, a driving cone fast on the motor shaft having a friction face, a roller frame spanning the ends of said shafts and having its ends loosely journaled on said shafts respectively, rollers journaled in said frame lying in peripheral contact with the surface of the driving cone, means for transmitting motion from said rollers to the driven shaft to reverse the motion thereof, means for locking one end of said frame to the driven shaft, and means for locking the other end of said frame to the motor shaft.

10. In a transmission mechanism, the combination of the motor and driven shafts journaled to rotate independently, a roller-carrying frame spanning the meeting ends of said shafts and loosely mounted at its ends thereon, rollers journaled in said frame, means for driving said rollers, a reversing disk loosely mounted on the driven shaft with which said rollers are in frictional contact, means for locking one end of said frame to the driven shaft and disengaging it therefrom, means for locking the other end of said frame to the motor shaft and disengaging it therefrom, means for locking the reversing disk to the driven shaft and means for restraining the rotation of said disk.

11. In a transmission mechanism, the combination of the motor and driven shafts, independently rotatable, of means mounted upon said shafts and rotatable therewith for connecting them to cause them to turn at the same rate of speed, and frictional transmission mechanism for connecting the shafts indirectly to turn the driven shaft in either direction at a speed different from that of the motor shaft.

12. In a transmission mechanism, the combination of the motor and driven shafts independently rotatable, a driving cone fast on the motor shaft, a roller frame spanning the ends of said shafts and having its ends loosely mounted on said shafts respectively, rollers journaled on said frame lying in peripheral contact with the driving cone, and means coöperating with said rollers to turn said driven shaft in either direction.

13. In a transmission mechanism, the combination of the motor and driven shafts independently rotatable, a driving cone fast on the motor shaft, a roller frame spanning the ends of said shafts and having its ends loosely mounted on said shafts respectively, rollers journaled on said frame lying in peripheral contact with the driving cone, means coöperating with said rollers to turn said driven shaft in either direction, and means for coupling the opposite ends of the roller frame to the motor and driven shafts respectively to cause them to revolve in the same direction and at the same speed.

In testimony whereof, I sign this specification in the presence of two witnesses.

ORSON W. DAVIS.

Witnesses:
EUGENE M. STROUSS,
LEWIS S. AUSTIN.